United States Patent [19]

Campbell et al.

[11] 3,768,047

[45] Oct. 23, 1973

[54] LATTICE NETWORK USING DISTRIBUTED IMPEDANCE TRANSMISSION LINES

[75] Inventors: Thomas Herbert Campbell, Flemington; Paul Schnitzler, Kendall Park, both of N.J.; Laurice Juston West, Levittown, Pa.

[73] Assignee: RCA Corporation, New York, N.Y.

[22] Filed: Dec. 9, 1971

[21] Appl. No.: 206,421

[52] U.S. Cl. ................ 333/73 S, 333/74, 333/84 R, 333/84 M

[51] Int. Cl. ............................................ H01p 1/20

[58] Field of Search .................. 333/73 S, 74, 84 R, 333/84 M, 11

[56] References Cited

UNITED STATES PATENTS

| | | | |
|---|---|---|---|
| 3,492,603 | 1/1970 | Fredrick, Jr. | 333/11 X |
| 3,621,400 | 11/1971 | Paciorek | 333/11 X |

*Primary Examiner*—Paul L. Gensler
*Attorney*—Edward J. Norton

[57] ABSTRACT

A lattice network operable at microwave frequencies is described. Each of the two series arm impedances is formed by a staggered parallel transmission line stub. The cross arm impedances are formed by microstrip transmission line stubs.

9 Claims, 3 Drawing Figures

PATENTED OCT 23 1973 3,768,047

LATTICE NETWORK USING DISTRIBUTED IMPEDANCE TRANSMISSION LINES

BACKGROUND OF THE INVENTION

1. Field of the Invention

This invention relates to a lattice network and more particularly to a lattice network operable at microwave signal frequencies.

2. Brief Description of Prior Art

The microwave frequency region is commonly taken to include frequencies of $10^9$ hertz per second and higher. A lattice network using lumped element impedances is well known at considerably lower frequencies. A lattice network operable at microwave frequencies using distributed transmission line impedances is unknown. Lattice networks at lower frequencies find use as filters and equalizers. It is possible in a lattice to control the transmission characteristics entirely independent of the image impedance behavior. This allows one to design a great number of circuits for which no unbalanced form exists. A further description of a lattice network is found in the detailed description.

SUMMARY OF THE INVENTION

Briefly, according to the present invention a four terminal, lattice network is provided including four distributed impedance transmission lines coupled in series to form a mesh. The first transmission line is coupled between the first and the second terminals of the network. The second transmission line is coupled between the second and the third terminals of the network. The third transmission line is coupled between the third and fourth terminals of the network. The fourth transmission line is coupled between the fourth and the first terminals of the network. The input signals are coupled across the first and third terminals and the output signals are taken across the second and fourth terminals.

DESCRIPTION OF THE DRAWING

A more detailed description follows in conjunction with the following drawing wherein.

DETAILED DESCRIPTION

Figure 1:
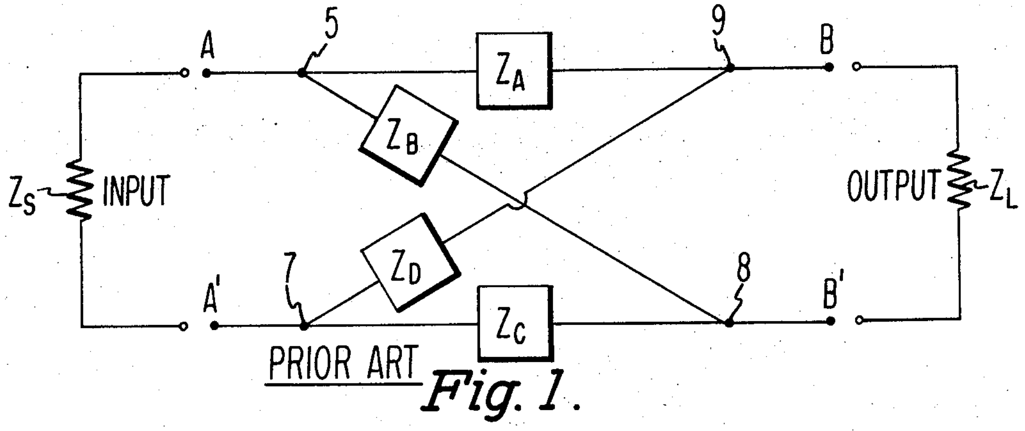
FIG. 1 is a schematic diagram of a lattice network.

Referring to FIG. 1, there is illustrated in schematic form a lattice network. The International Dictionary of Physics and Electronics, published by D. VanNostrand Co. of Princeton, N.J. defines a lattice network as "a network composed of four branches connected in series to form a mesh, two non-adjacent junction points serving as the input terminals, while the remaining two non-adjacent junction points serve as output terminals." The impedances $Z_A$ and $Z_C$ in FIG. 1 are sometimes referred to as the series impedances, and the impedances $Z_B$ and $Z_D$ are sometimes referred to as the cross impedances. As can be seen, the impedances $Z_A$, $Z_B$, $Z_C$ and $Z_D$ are in series in the form of a loop or mesh. The two non-adjacent junctions 5 and 7 are connected to the input terminals A and A , and the other two non-adjacent junction points 9 and 8 are connected to output terminals B and B'. In one arrangement for example, a source impedance $Z_S$ would be coupled across input terminals A and A' and the load impedance $Z_L$ across output terminals B and B'.

Figure 2:
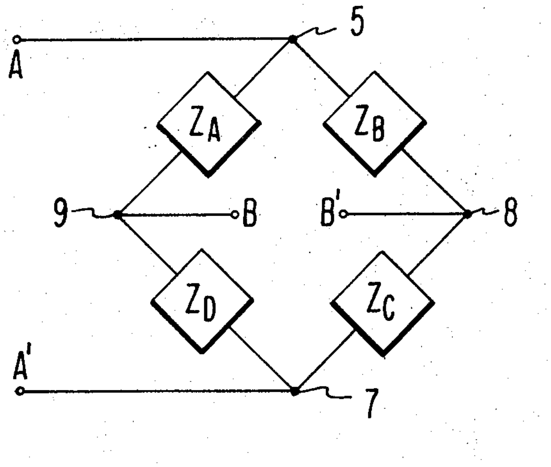
PRIOR ART Fig. 2.
FIG. 2 is a schematic diagram of a lattice network in a bridge configuration.

The lattice network may be redrawn as a bridge circuit as shown in FIG. 2. The input is applied across one diagonal A – A' of the bridge, and the output is taken from the other diagonal B – B'. Lattice networks find use as filters and phase equalizers. The image impedance of a lattice network depends only upon the product of the two branch impedances and the transfer impedance depends only upon the ratio of these impedances. It is therefore possible in the lattice to control the transmission characteristics entirely independent of the image impedance behavior. This allows one to design a great number of circuits for which no unbalanced form exists. The constant resistance lattice in particular is useful in phase equalization where the desired transfer phase characteristic is realized while maintaining a constant input impedance and low loss.

Figure 3:
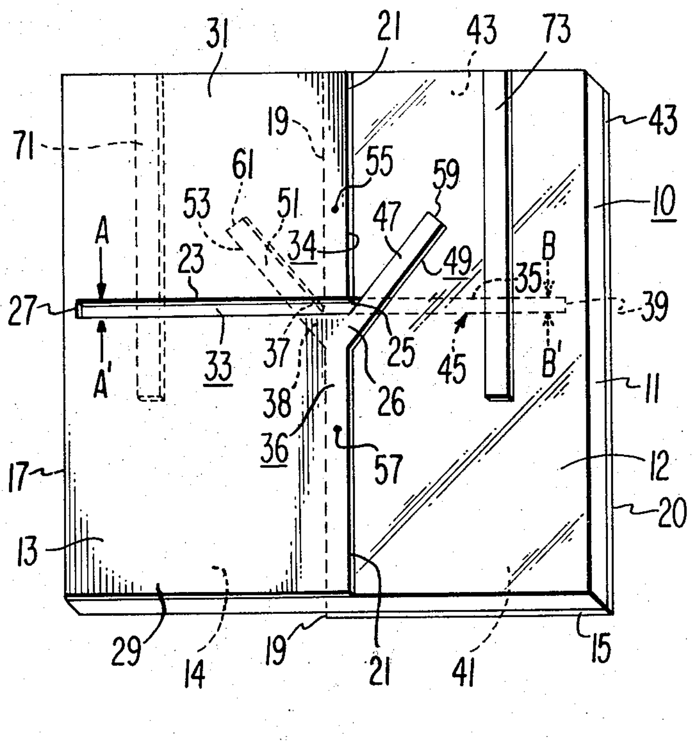
FIG. 3 is a perspective view of a microwave lattice network employing the staggered transmission line in accordance with the present invention.

Referring to FIG. 3, there is illustrated a microwave lattice network 10. The lattice network 10 includes a flat dielectric substrate 11 with a first broad metal plate 13 on one surface 12 of the substrate 11 and another broad metal plate 15 on the opposite parallel surface 14 of the dielectric substrate 11. The plates 13 and 15 are staggered and parallel relative to each other such that plate 13 has a first edge 17 advanced to the left in FIG. 3 relative to first edge 19 of plate 15. That edge 21 of plate 13 opposite and parallel to the edge 17 overlaps slightly edge 19 of plate 15. The width of each of the plates 13 and 15 is, for example, about 0.510 inches and the overlap of the plates 13 and 15 is 10 mils. The dielectric constant of the substrate 11 is about 9.3 and the thickness 25 mils. This type of structure forms a new type of transmission line described in copending application Ser. No. 206,420 of Laurice J. West filed on even date. The characteristic impedance of such a transmission line is controlled by the spacing between the plates, the amount of overlap or underlap and the dielectric constant of the substrate. To form the transmission referred to as a staggered transmission line, the plate need not overlap but the near edges (edges 19 and 21 for the above example) must be close enough to, with the dielectric substrate, confine the electric field of electromagnetic waves between the plates.

Plate 13 has a narrow slot 23 therein extending from a point 27 near edge 17 and intersects the edge 21 of plate 13 at point 25. The slot 23 extends perpendicular to edge 21 in a manner to substantially divide the plate 13 into a first broad conductive portion 29 and a second equally broad conductive portion 31. The narrow slot 23 is of such width and the width of conductive portions 29 and 31 on either side of the slot is such as to provide a slot transmission line 33 which extends from point 25 to 27.

Plate 15 has a similar narrow slot 35 therein which extends from a point 39 near edge 20 opposite and parallel to the overlapping edge 19, intersecting the edge 19 at point 37. This slot 35 extends perpendicular to edge 19 in a manner to substantially divide plate 15 into a first broad conductive portion 41 and a second broad conductive portion 43. The narrow slot 35 is of such width and the width of the conductive portions 41 and 43 on either side of the slot 23 is of such as to provide a second slot transmission line 45 between point 37 and point 39. By the slotting of plates 13 and 15, the previously described staggered transmission line is divided to form two staggered transmission lines. The first staggered line is formed by conductive portion 31 and conductive portion 43, and the second staggered line is formed by conductive portion 29 and conductive portion 41.

A first narrow strip-like conductor 47 extends along surface 12 from edge 21 of portion 29 to a point 59 above conductive portion 43. The first narrow strip-like conductor 47 extends from that portion 26 of edge 21 that is adjacent to point 25 of slot 23. The narrow strip-like conductor 47 provides with plate 15 a microstrip transmission line section 49.

A second narrow strip-like conductor 51 on the opposite surface 14 of dielectric substrate 11 extends from edge 19 of portion 41 to a point 61. The second narrow strip-like conductor 51 extends below portion 31 of metal plate 13 to form a second microstrip transmission line section 53. The second narrow strip-like conductor 51 extends from that portion 38 of edge 19 that is adjacent to point 37 of slot 35.

The input terminals A and A' in FIGS. 1 and 2 can be considered in FIG. 3 to be taken at point A on portion 31 of metal plate 13 and point A' at portion 29 of metal plate 13. The series arm impedance $Z_A$ of FIG. 1 is provided in the structure of FIG. 3 by the staggered transmission line section 34 formed by portion 31 of plate 13 and portion 43 of plate 15. At point 55, portion 31 of metal plate 13 is connected to portion 43 of metal plate 15. This connection may be accomplished by a hole in the dielectric substrate 11 at point 55 and a conductive connecting wire joining plate 13 to 15. The transmission line section 34 propagates coupled signal waves between points 25 and 55.

Similarly, the other series arm impedance $Z_C$ of FIG. 1 is provided by the staggered transmission line section 36 formed by portion 29 of plate 13 and portion 41 of plate 15. At point 57, portion 29 of metal plate 13 is connected to portion 41 of metal plate 15. Again, this connection may be accomplished by a conductive wire passed through an aperture or hole in the dielectric substrate 11 with the wire connecting portion 29 of metal plate 13 to portion 41 of metal plate 15. The transmission line section 36 propagates coupled signal waves between points 25 and 57. The output terminals B and B' in FIGS. 1 and 2 are at points B and B', for example, on plate 15 in FIG. 3.

The cross arm impedance $Z_B$ in FIG. 1 is formed in the structure of FIG. 3 by the microstrip line section 53. The cross arm impedance $Z_D$ is formed by the microstrip line section 49. The microstrip line sections 49 and 53 are shown as open circuited at their ends 59 and 61 respectively.

The desired impedance that each of the series or shunt arms is to present can be controlled by the positions of the shorts or opens in any of the described transmission lines relative to points 25 and 37. In the arrangement shown in FIG. 3, for example, shorting points 55 and 57 of transmission line sections 34 and 36 respectively were made about one-quarter wavelength at the center frequency from points 25 and 37. Transmission line sections 49 and 53 open circuited at ends 59 and 61 were also one-quarter wavelength long at the center frequency. The characteristic impedances of these lengths were chosen such that the series impedance $Z_A$ times cross impedance $Z_B$ was equal to 1 (impedance is normalized) so that the particular lattice fabricated was a constant resistance lattice.

Input and output couplings to the lattice network 10 could be provided by extending slot 23 from point 27 to intersect with edge 17 and by extending slot 35 to intersect with edge 20. A pair of balanced line conductors would be coupled to A and A' such that the first conductor is coupled to plate 31 at A and the second conductor is coupled to plate 29 at A'. Similarly, a pair of balanced line conductors would be coupled at B and B' such that the first would be coupled at B and the second at B'.

In the embodiment shown in FIG. 3, a conversion between a balanced slot transmission line to unbalanced microstrip transmission line is provided. At the input of the lattice network this conversion is provided by narrow conductor 71 on surface 14 of substrate 11. This narrow conductor 71 extends over the slot 23 and forms with plate 13 a microstrip transmission line that couples input signals across slot 23. The coupled signals are propagated along slot transmission line 33 to point 25. At the output of the lattice network 10, a connection from balanced slot transmission line 45 to unbalanced microstrip transmission line is provided by narrow conductor 73 which extends on surface 12 of substrate 11 over slot 35 and above plate 15. The narrow conductor 73 forms with plate 15 a microstrip transmission line coupled to the signals across slot 35.

A lattice network constructed as described with reference to FIG. 3 had the following dimensions:

Substrate 11 is 1 inch by 1 inch and 25 mils thick alumina of a dielectric constant about 9.3.

Plates 13 and 15 are 0.510 inch wide (between edges 17 and 21 of plate 13 and between edges 19 and 20 of plate 15).

Plates 13 and 15 are overlapped 10 mils.

Slots 23 and 25 are about 5 mils wide and about 480 mils long.

Portion 31 is about 490 mils long from the edge of slot 23 to the opposite edge of the portion 31.

Portion 43 is about 490 mils long from the edge of slot 35 to the opposite edge of the portion 43.

Portion 29 is about 505 mils long from the edge of slot 23 to the opposite edge of the portion 29.

Portion 41 is about 505 mils long from the edge of slot 35 to the opposite edge of the portion 41.

Narrow conductors 71 and 73 are about 670 mils long and about 30 mils wide.

Narrow conductors 47 and 51 are about 175 mils long and about 20 mils wide.

Distance from slot 23 to shorts at points 55 and 57 is about 175 mils.

Distance from slot 35 to shorts at points 55 and 57 is about 175 mils.

In order to provide a lattice filter, the microstrip transmission line sections 49 and 53 are shorted at the ends 59 and 61. The network 10 would now reject the center frequency.

What is claimed is:

1. A four terminal coupling network comprising:

a first radio frequency distributed transmission line formed from a conductor connected to a first terminal of said network and a separate conductor connected to the second terminal of said network, a second radio frequency distributed transmission line formed from a conductor connected to said second terminal of said network and a separate conductor connected to the third terminal of said network, a third radio frequency distributed transmission line formed from a conductor connected to said third terminal and a separate conductor connected to the fourth terminal of said network, and a fourth radio frequency distributed transmission line formed from a conductor connected to said fourth terminal and a separate conductor connected to said first terminal, means for coupling an input signal of a certain phase across said first and third terminals of said network and means connected to said second and fourth terminals for coupling an output signal of a certain phase from said network, and means by which said distributed transmission lines are formed with selected lengths and with a selected one of open and short circuit termination to determine the impedance across said terminals and the transmission characteristics of said network.

2. The combination as claimed in Claim 1 wherein said first and third distributed transmission lines are staggered transmission lines with said conductors thereof being broad conductive metal plates with said plates being in staggered parallel relationship with respect to each other with an edge of one metal plate being closely spaced with a non-corresponding edge of the other and with the maximum overlap of said metal plates being less than one half the width of either metal plate.

3. The combination as claimed in claim 2, wherein said second and fourth distributed transmission lines are microstrip transmission lines.

4. A lattice network capable of operating over a given range of microwave frequencies comprising:

a dielectric substrate, a first relatively broad metal strip attached to one surface of said substrate, a second relatively broad metal strip attached to the opposite surface of said dielectric substrate, said second metal strip being oriented in staggered parallel relationship to the first metal strip with an edge of one metal strip being closely spaced with a non-corresponding edge of the other and with the maximum overlap of said metal strips being less than one half the width of either metal strip, a first narrow slot extending from a first point along the closely spaced edge of said first metal strip in a direction so as to substantially divide said first metal strip into a first and a second section to provide a first slot transmission line on said one surface of said dielectric substrate, a second narrow slot extending from a point along the closely spaced edge of said second metal strip in a direction away from said first metal strip to divide said second metal strip into first and second sections to provide a second slot transmission line, said point along said edge of said second metal strip being on said opposite surface and adjacent to said point along the closely spaced edge of said first metal strip, said first section of said first metal strip and said first section of said second metal strip providing a first staggered transmission line extending in a first direction away from the adjacent points and said second section of said first metal strip and said second section of said second metal strip forming a second staggered transmission line extending in a direction opposite said first direction away from said adjacent points, the spacing between the metal strips and the dielectric constant of the medium therebetween being determined so that the electromagnetic fields associated with an electromagnetic wave coupled to the staggered transmission lines are essentially confined to the region between the metal strips, a first narrow strip-like conductor extending from said first section of said first metal strip to a point above said second section of said second metal strip to form a first microstrip transmission line, a second narrow strip-like conductor extending from the first section of said second metal strip to a point below the second section of said first metal strip to form a second microstrip transmission line, said staggered transmission lines and said microstrip transmission lines having their lengths and their type of terminations chosen to control the transmission characteristics of said network.

5. The combination as claimed in claim 4, including a third and a fourth narrow strip-like conductor, said third narrow strip-like conductor located on said one surface and extending parallel to and directly above said second metal strip, said third narrow strip-like conductor oriented substantially perpendicular to said second slot in said second metal strip for coupling signals along said second slot between said third narrow strip-like conductor and said second metal strip, said fourth narrow strip-like conductor located on said opposite surface and spaced from said first relatively broad metal strip, said fourth narrow strip-like conductor oriented orthogonal to said first slot transmission line in said first metal strip for coupling to signals propagating along said first slot transmission line.

6. The combination as claimed in claim 4, wherein said first section of said first metal strip is connected to the first section of the second metal strip and the second section of said first metal strip is connected to the second section of the second metal strip with said connecting points being located an equal distance from the adjacent points.

7. The combination as claimed in claim 6, wherein said distance is a quarter wavelength long at the center operating frequency of the lattice network.

8. The combination as claimed in claim 7, wherein said narrow strip-like conductors are each a quarter wavelength long at the center frequency of the network.

9. The combination as claimed in claim 8, wherein said narrow strip-like conductors are short circuited at the ends so as to provide a band reject filter.

* * * * *